United States Patent
Boyd et al.

(10) Patent No.: US 7,664,019 B2
(45) Date of Patent: Feb. 16, 2010

(54) METHOD AND APPARATUS FOR FACILITATING DIFFERENTIATED SERVICE QUALITIES IN AN ETHERNET PASSIVE OPTICAL NETWORK

(75) Inventors: Edward W. Boyd, Petaluma, CA (US); Thyagarajan Subramanian, Rohnert Park, CA (US); Lawrence D. Davis, Petaluma, CA (US)

(73) Assignee: Teknovus, Inc., Petaluma, CA (US)

( * ) Notice: Subject to any disclaimer, the term of this patent is extended or adjusted under 35 U.S.C. 154(b) by 632 days.

(21) Appl. No.: 11/223,487

(22) Filed: Sep. 8, 2005

(65) Prior Publication Data

US 2006/0039390 A1 Feb. 23, 2006

Related U.S. Application Data

(63) Continuation-in-part of application No. 10/925,175, filed on Aug. 23, 2004, now Pat. No. 6,967,949.

(51) Int. Cl.
*H04L 12/56* (2006.01)
*H04B 10/20* (2006.01)

(52) U.S. Cl. .................. 370/230; 370/392; 370/395.52; 398/58

(58) Field of Classification Search ......... 370/229–238, 370/389–392, 395.52, 395.53, 465–466; 389/58, 66–67, 70–72, 74
See application file for complete search history.

(56) References Cited

U.S. PATENT DOCUMENTS

| | | | |
|---|---|---|---|
| 7,330,654 B2 * | 2/2008 | Song et al. ................ 398/71 |
| 7,379,676 B2 * | 5/2008 | Kang et al. ................ 398/168 |
| 2003/0190168 A1 * | 10/2003 | Song et al. ................ 398/168 |
| 2004/0120326 A1 * | 6/2004 | Yoon et al. ............. 370/395.53 |
| 2004/0264961 A1 * | 12/2004 | Nam et al. .................... 398/58 |
| 2005/0100036 A1 * | 5/2005 | Davis ........................ 370/432 |
| 2005/0220129 A1 * | 10/2005 | Boyd ........................ 370/428 |

OTHER PUBLICATIONS

Kramer et al., "Supporting Differentiated Classes of Service in Ethernet Passive Optical Networks", Aug. & Sep. 2002, Optical Society of America, Journal of Opticle Networking, vol. 1, No. 8&9, pp. 280-298.*

Shin, et al., "An ONU Design for EPON-based Access Network", Sep. 2003, IEEE, 0-7803-8114-9/03, pp. 1194-1197.*

* cited by examiner

*Primary Examiner*—Tri H Phan
(74) *Attorney, Agent, or Firm*—Park, Vaughan & Fleming, LLP

(57) ABSTRACT

One embodiment of the present invention provides a system for forwarding packets in an Ethernet passive optical network (EPON) which includes a central node and at least one remote node. During operation, the system associates a logical link identifier (LLID) to a logical link between the central node and a remote node, wherein the logical link corresponds to a priority level based on a certain service level agreement (SLA). After receiving a packet to be forwarded to a remote node, the system then determines the value of one or more fields within the packet which is used to indicate a priority level for the packet. Subsequently, the system assigns an LLID to the packet based on the value of the one or more fields, thereby facilitating differentiated service qualities within the EPON.

22 Claims, 11 Drawing Sheets

METHOD AND APPARATUS FOR FACILITATING DIFFERENTIATED SERVICE QUALITIES IN AN ETHERNET PASSIVE OPTICAL NETWORK

RELATED APPLICATION

This application is a continuation-in-part of a U.S. patent application, entitled "Method and Apparatus for Forwarding Packets in an Ethernet Passive Optical Network," by inventors Lawrence D. Davis, Edward W. Boyd, and Glen Kramer, having Ser. No. 10/925,175 and a filing date of 23 Aug. 2004 now U.S. Pat. No. 6,967,949. This application hereby claims priority under 35 U.S.C. §120 to the above-listed patent application and incorporates the above-listed application by reference.

BACKGROUND

1. Field of the Invention

The present invention relates to the design of Ethernet passive optical networks. More specifically, the present invention relates to a method and apparatus for facilitating differentiated service qualities in an Ethernet passive optical network.

2. Related Art

In order to keep pace with increasing Internet traffic, optical fibers and associated optical transmission equipment have been widely deployed to substantially increase the capacity of backbone networks. This increase in the capacity of backbone networks, however, has not been matched by a corresponding increase in the capacity of access networks. Even with broadband solutions, such as digital subscriber line (DSL) and cable modem (CM), the limited bandwidth offered by current access networks creates a severe bottleneck in delivering high bandwidth to end users.

Among the different technologies that are presently being developed, Ethernet passive optical networks (EPONs) are one of the best candidates for next-generation access networks. EPONs combine ubiquitous Ethernet technology with inexpensive passive optics. Hence, they offer the simplicity and scalability of Ethernet with the cost-efficiency and high capacity of passive optics. In particular, due to the high bandwidth of optical fibers, EPONs are capable of accommodating broadband voice, data, and video traffic simultaneously. Such integrated service is difficult to provide with DSL or CM technology. Furthermore, EPONs are more suitable for Internet Protocol (IP) traffic, because Ethernet frames can directly encapsulate native IP packets with different sizes, whereas ATM passive optical networks (APONs) use fixed-size ATM cells and consequently require packet fragmentation and reassembly.

Typically, EPONs are used in the "first mile" of the network, which provides connectivity between the service provider's central offices and business or residential subscribers. Logically, the first mile is a point-to-multipoint network, with a central office servicing a number of subscribers. A tree topology can be used in an EPON, wherein one fiber couples the central office to a passive optical splitter, which divides and distributes downstream optical signals to subscribers and combines upstream optical signals from subscribers (see FIG. 1).

Transmissions within an EPON are typically performed between an optical line terminal (OLT) and optical network units (ONUs) (see FIG. 2). The OLT generally resides in the central office and couples the optical access network to a metro backbone, which is typically an external network belonging to an Internet Service Provider (ISP) or a local exchange carrier. An ONU can be located either at the curb or at an end-user location, and can provide broadband voice, data, and video services. ONUs are typically coupled to a one-by-N (1×N) passive optical coupler, where N is the number of ONUs, and the passive optical coupler is typically coupled to the OLT through a single optical link. (Note that one may use a number of cascaded optical splitters/couplers.) This configuration can significantly save the number of fibers and amount of hardware required by EPONs.

Communications within an EPON can be divided into downstream traffic (from OLT to ONUs) and upstream traffic (from ONUs to OLT). In the downstream direction, because of the broadcast nature of the 1×N passive optical coupler, data frames are broadcast by the OLT to all ONUs and are selectively extracted by their destination ONUs. In the upstream direction, the ONUs need to share channel capacity and resources, because there is only one link coupling the passive optical coupler with the OLT.

To interoperate with other Ethernet equipment, an EPON needs to comply with the IEEE 802 standards, which specify two types of Ethernet operation: shared-medium operation and point-to-point operation. In a shared-medium Ethernet segment, all hosts are coupled to a single access domain over a common medium (e.g., a copper cable). Because the transmission medium is shared by all the hosts, only one host can transmit at a time while others are receiving. Point-to-point operation is proper when one link couples only two hosts. With a full-duplex point-to-point link, both hosts may transmit and receive simultaneously when communicating with each other.

An Ethernet bridge interconnects multiple Ethernet segments and forwards Ethernet frames among these segments. A bridge typically has a number of ports, each of which may couple to either a shared-medium segment or a point-to-point segment. According to the IEEE 802 standards, a bridge forwards a frame to a port associated with the frame's destination medium access control (MAC) address. A bridge does not forward a frame to a port on which it arrives. It is generally assumed that, if the frame's destination address is associated with the port on which the frame arrives, a frame's destination host is on the same shared-medium segment (called "broadcast domain") as the source host. This is because communication between hosts on the same broadcast domain can usually be performed without the help of the bridge.

A bridge maintains a MAC address-port mapping table by associating the source MAC address of a frame with the port on which it arrives. When an arriving frame's MAC destination address does not correspond to any port (i.e., the bridge has not established a MAC address-port mapping relationship for this address), the bridge floods the frame to every port except for the one on which the frame arrives.

In an EPON, an OLT generally behaves like an Ethernet bridge. The tree topology of an EPON, however, presents a problem: if the head end (OLT side) of the upstream link is coupled to one single port of the bridge residing in the OLT, the bridge will not forward any frames sent by an ONU to another ONU. This is because the entire EPON, which couples to the bridge through one port, appears to be a single shared-medium segment to the bridge. Because of the one-way broadcast nature of an EPON, an ONU cannot receive signals sent by other ONUs, unless the signals are switched and re-transmitted downstream. Fortunately, one can solve this problem by creating a logical link between each ONU and the OLT, and creating a virtual port on the bridge corresponding to this logical link. In this way, each ONU has its own logical port on the bridge, and operates as if there is a pointto-point link between the ONU and the OLT (this is called point-to-point emulation, PtPE). An upstream frame from an ONU is assigned a logical link identifier (LLID) that identifies to which virtual port this frame should go.

Although PtPE solves the bridging issue, the default bridge behavior of an OLT still has limitations. One such limitation is that an OLT typically does not have a mechanism to facilitate differentiated service qualities. Such differentiation is desirable because different end users would want different services at different prices. For example, while residential customers typically do not require strict, high quality of service (QoS), commercial or enterprise customers would like to purchase high quality services with guaranteed QoS. At present, there is no available mechanism within an OLT to accommodate various service level agreements (SLAs) with differentiated QoS.

Hence, what is needed is a method and an apparatus for facilitating differentiated service qualities in an EPON which allows a service provider to provided more diversified services.

SUMMARY

One embodiment of the present invention provides a system for forwarding packets in an Ethernet passive optical network (EPON) which includes a central node and at least one remote node. During operation, the system associates a logical link identifier (LLID) to a logical link between the central node and a remote node, wherein the logical link corresponds to a priority level based on a certain service level agreement (SLA). After receiving a packet to be forwarded to a remote node, the system determines the value of one or more fields within the packet which is used to indicate a priority level for the packet. Subsequently, the system assigns an LLID to the packet based on the value of the one or more fields, thereby facilitating differentiated service qualities within the EPON.

In a variation of this embodiment, determining the value of one or more fields within the packet involves determining the value of a Class of Service (CoS) field within a medium access control (MAC) header of the packet.

In a variation of this embodiment, determining the value of one or more fields within the packet involves determining the value of a Type of Service (ToS) field within an Internet Protocol (IP) header of the packet.

In a variation of this embodiment, the system also learns the source MAC addresses of upstream packets transmitted by a remote node to the central node, thereby allowing the central node to determine whether the received packet's destination MAC address matches one of the MAC addresses previously learned by the central node.

In a further variation, determining the value of one or more fields within the packet involves determining the values of the packet's destination MAC address, VLAN identifier (if present), and CoS field and/or ToS field. If the packet's destination MAC address matches a MAC address previously learned by the central node, assigning the LLID to the packet involves assigning to the packet a unicast LLID associated with the packet's VLAN identifier, destination MAC address, and the priority level corresponding to the CoS and/or ToS value(s) of the packet.

In a further variation, if the packet's destination MAC address does not match any MAC address previously learned by the central node, assigning the LLID to the packet involves assigning to the packet a multicast LLID associated with the packet's VLAN identifier and the priority level corresponding to the CoS and/or ToS values(s) of the packet.

In a further variation, determining the value of one or more fields within the packet involves determining the values of the packet's destination MAC address and ToS and/or CoS field(s). If the packet's destination MAC address does not match any MAC address previously learned by the central node, assigning the LLID to the packet involves assigning to the packet a broadcast LLID associated with the priority level corresponding to the ToS and/or CoS values(s) of the packet.

In a further variation, if the packet's destination MAC address matches a MAC address previously learned by the central node, assigning the LLID to the packet involves assigning to the packet a unicast LLID associated with the packet's destination MAC address and the priority level corresponding to the ToS and/or CoS value(s) of the packet.

One embodiment of the present invention provides a system for forwarding packets in an EPON which includes a central node and at least one remote node. After receiving an upstream packet transmitted from a remote node, the system determines the value of one or more field(s) of the upstream packet. The system then sets a value for the CoS field of the upstream packet based on the previously determined value of the one or more field(s). Subsequently, the system forwards the upstream packet to an external network.

In a variation of this embodiment, determining the value of one or more field(s) of the upstream packet involves determining the value of the ToS and/or CoS field(s) of the upstream packet.

One embodiment of the present invention provides a system for forwarding packets in an EPON which includes a central node and at least one remote node. During operation, the system establishes a mapping between multiple VLAN identifiers and a multicast or broadcast LLID. After receiving a downstream packet, the system attaches to the packet the multicast or broadcast LLID based on the packet's VLAN identifier or lack thereof and forwards the packet to all the remote nodes. By doing so, the system allows the remote nodes to determine whether to forward the packet to their corresponding users based on the packet's VLAN identifier and/or the packet's destination address.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention (e.g., general passive optical network (PON) architectures). Thus, the present invention is not intended to be limited to the embodiments shown, but is to be accorded the widest scope consistent with the principles and features disclosed herein.

The operation procedures described in this detailed description may be stored on a digital-circuit readable storage medium, which may be any device or medium that can store code and/or data for use by digital circuits. This includes, but is not limited to, application specific integrated circuits (ASICs), field-programmable gate arrays (FPGAs), semiconductor memories, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated).

Passive Optical Network Topology

Figure 1:
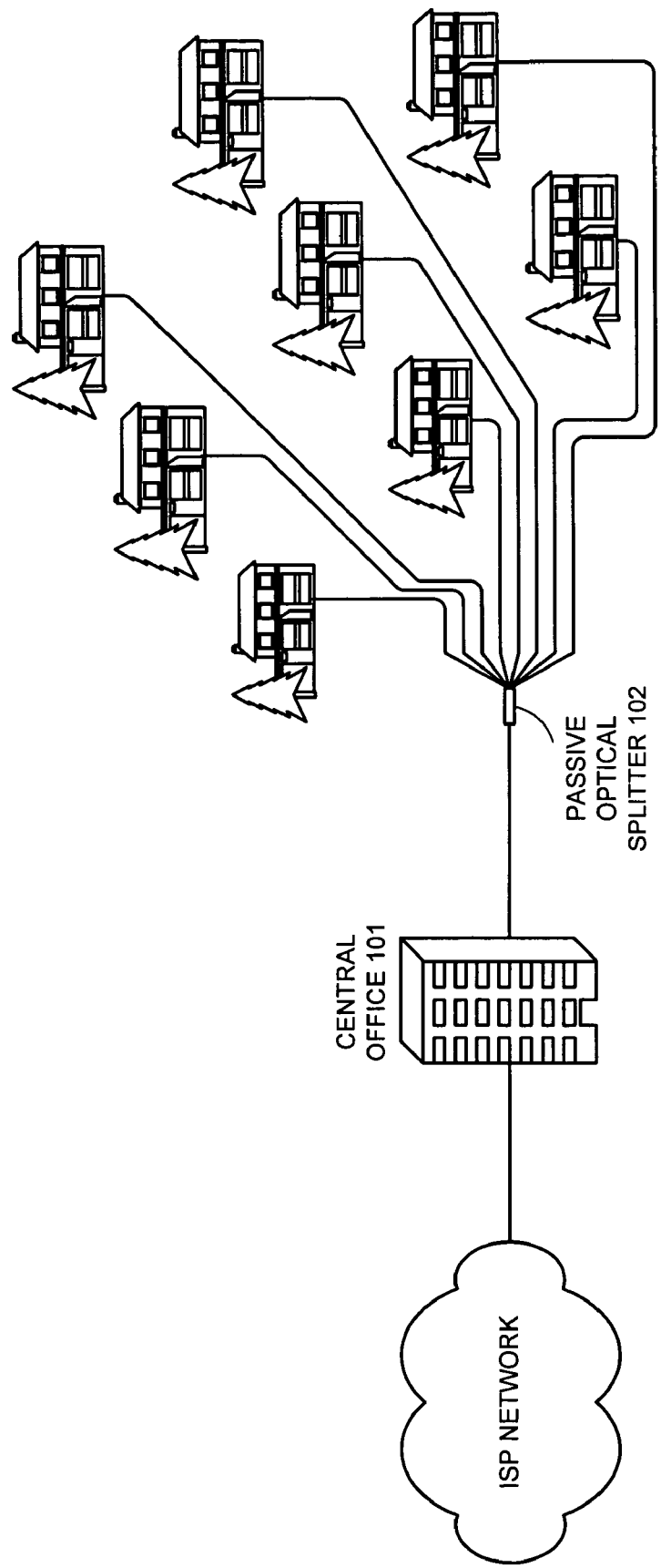
FIG. 1 illustrates an EPON wherein a central office and a number of subscribers are coupled through optical fibers and an Ethernet passive optical splitter (prior art).

FIG. 1 illustrates a passive optical network, wherein a central office and a number of subscribers are coupled through optical fibers and a passive optical splitter (prior art). As shown in FIG. 1, a number of subscribers are coupled to a central office 101 through optical fibers and a passive optical splitter 102. Passive optical splitter 102 can be placed in the vicinity of end-user locations, so that the initial fiber deployment cost is minimized. Central office 101 can be coupled to an external network 103, such as a metropolitan area network operated by an Internet service provider (ISP). Note that although FIG. 1 illustrates a tree topology, a PON can also be based on other topologies, such as a ring or a bus.

Normal Operation Mode in EPON

Figure 2:
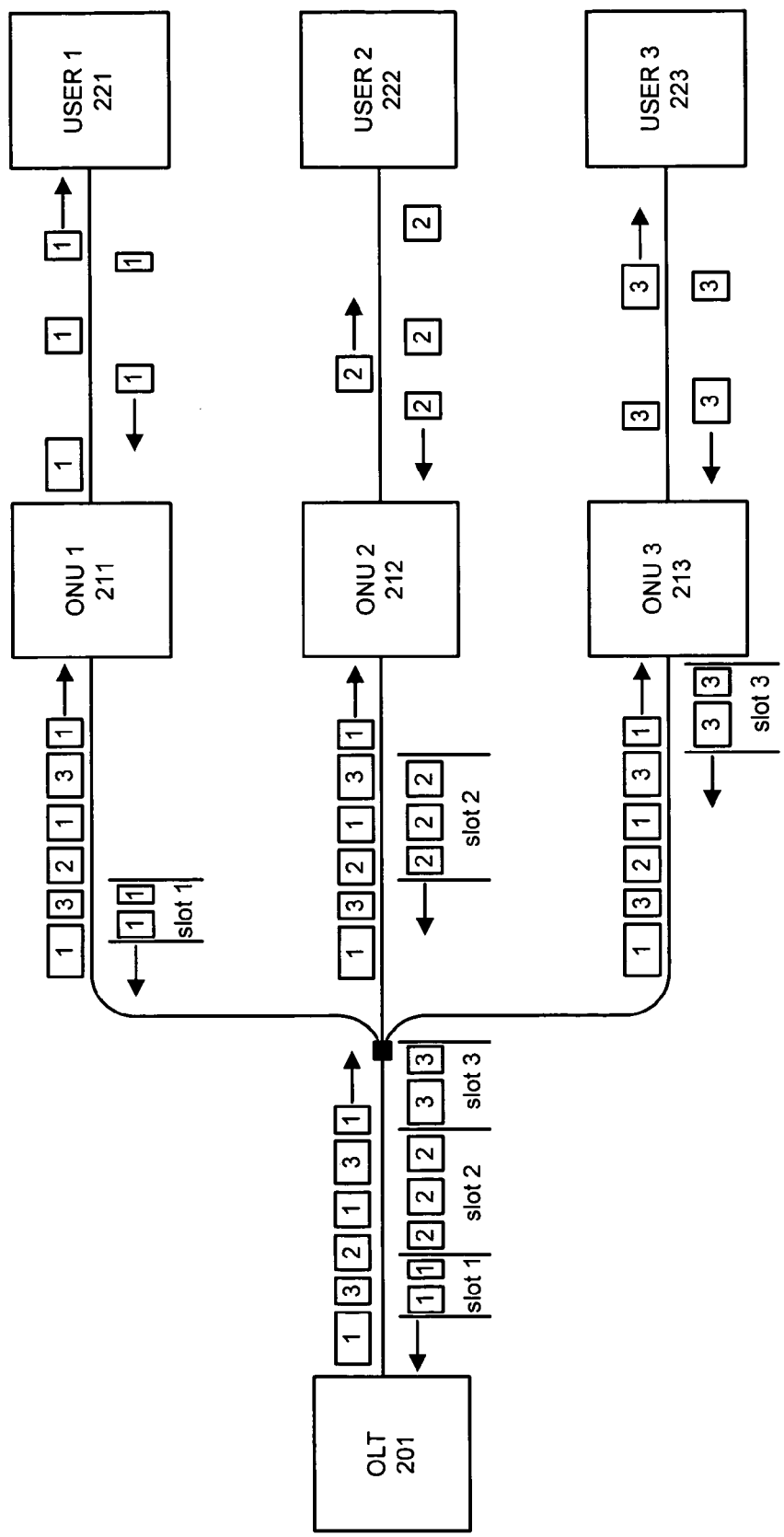
FIG. 2 illustrates an EPON in normal operation mode (prior art).

FIG. 2 illustrates an EPON in normal operation mode (prior art). To allow ONUs to join an EPON at arbitrary times, an EPON typically has two modes of operation: a normal operation mode and a discovery (initialization) mode. Normal operation mode accommodates regular upstream data transmissions, where an OLT assigns transmission opportunities to all initialized ONUs.

As shown in FIG. 2, in the downstream direction, OLT 201 broadcasts downstream data to ONU 1 (211), ONU 2 (212), and ONU 3 (213). While all ONUs may receive the same copy of downstream data, each ONU selectively forwards only the data destined to itself to its corresponding users, which are user 1 (221), user 2 (222), and user 3 (223), respectively.

In the upstream direction, OLT 201 first schedules and assigns transmission timeslots to each ONU according to the ONU's service-level agreement. When not in its transmission timeslot, an ONU typically buffers the data received from its user. When its scheduled transmission timeslot arrives, an ONU transmits the buffered user data within the assigned transmission window.

Since every ONU takes turns in transmitting upstream data according to the OLT's scheduling, the upstream link's capacity can be efficiently utilized. However, for the scheduling to work properly, the OLT needs to discover and initialize a newly joined ONU. During discovery, the OLT may collect information critical to transmission scheduling, such as the ONU's round-trip time (RTT), its media access control (MAC) address, its service-level agreement, etc. (Note that in some cases service-level agreement may already be known to the OLT).

General Ethernet Requirement

Figure 3:
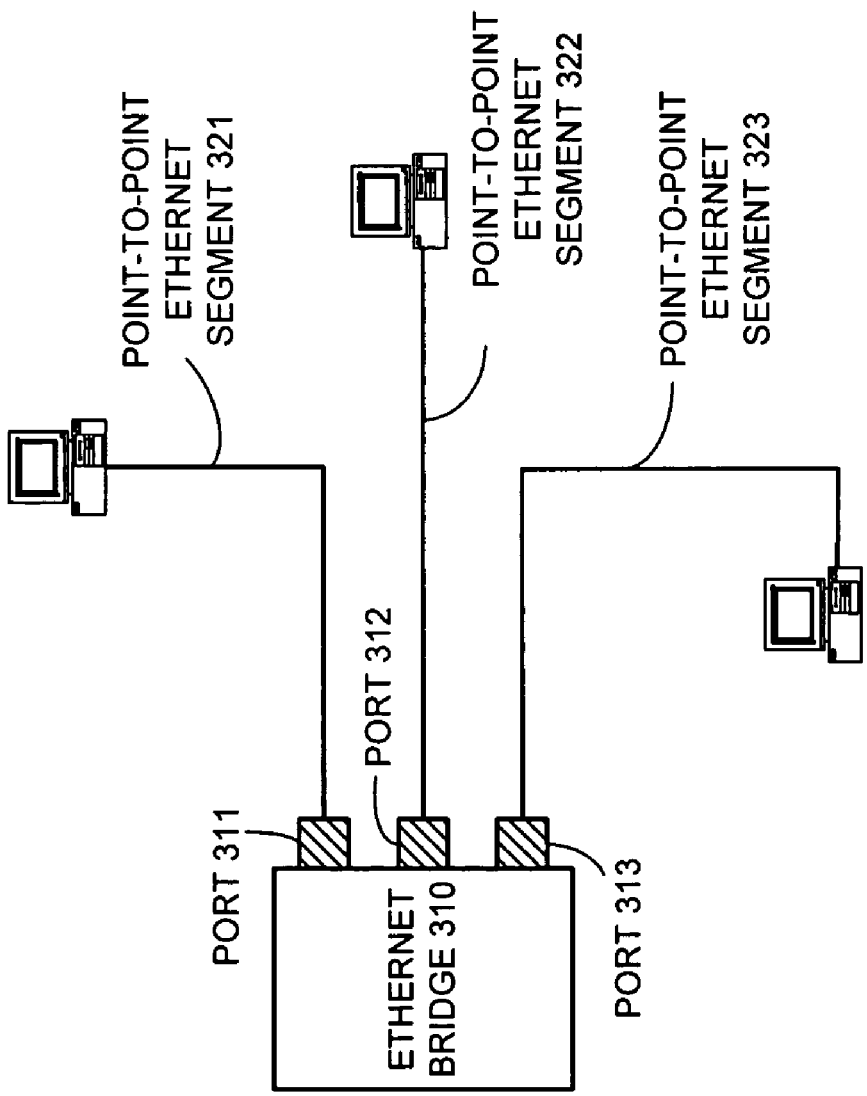
FIG. 3 illustrates bridged Ethernet segments (prior art).

FIG. 3 illustrates bridged Ethernet segments (prior art). The IEEE 802 standards allow an Ethernet segment to operate in a point-to-point mode. In a point-to-point Ethernet segment, a link couples two hosts, or a host and an Ethernet bridge. Point-to-point mode is a common form of operation in a switched Ethernet, such as Gigabit Ethernet.

When multiple Ethernet hosts need to communicate with one another, an Ethernet bridge typically couples and switches between multiple point-to-point Ethernet segments to allow inter-segment communications. As shown in FIG. 3, Ethernet bridge 310 has multiple ports. Point-to-point segments 321, 322, and 323 are coupled to ports 311, 312, and 323, respectively. If the host on segment 322 sends a data frame to the host on segment 321, the data frame will be forwarded by Ethernet bridge 310 from port 312 to port 311 according to its destination Ethernet (MAC) address. Generally, a bridge does not forward a frame back to the port on which it arrives, because the segment coupled to that port is assumed to be a shared-medium segment, wherein the destination host can receive the frame without the frame being forwarded by the bridge.

Point-to-Point Emulation (PtPE) in EPON

In an EPON, because the upstream transmission from an ONU to the OLT is point-to-point communication, the operation of EPON ideally conforms to the point-to-point Ethernet operation as defined by the IEEE 802 standard. However, the EPON architecture does not automatically satisfy the requirement of bridged point-to-point Ethernet: if the EPON upstream link is coupled to one Ethernet bridge port, and all the upstream traffic is received at that port, users connected to different ONUs on the same EPON will be unable to communicate with one another. The Ethernet bridge located within the OLT will not switch among the upstream data, because they are received at the same port. Such a configuration forces data traffic among ONUs within the same EPON to be processed on layer 3 (network layer) and switched by equipment that resides outside the EPON (e.g., an IP router to which the OLT is connected). This is a very inefficient way of delivering intra-EPON traffic.

To resolve this problem, and to ensure seamless integration of an EPON with other Ethernet networks, devices attached to the EPON medium ideally have an additional sub-layer that can emulate a point-to-point medium. This sub-layer is referred to as Point-to-Point Emulation (PtPE) sub-layer. This emulation sub-layer resides below the MAC layer to preserve existing Ethernet MAC operation defined in the IEEE P802.3 standards. Operation of this emulation layer relies on tagging Ethernet frames with tags unique for each ONU. These tags are called logic link IDs (LLIDs) and are placed in the preamble before each frame.

Figure 4A:
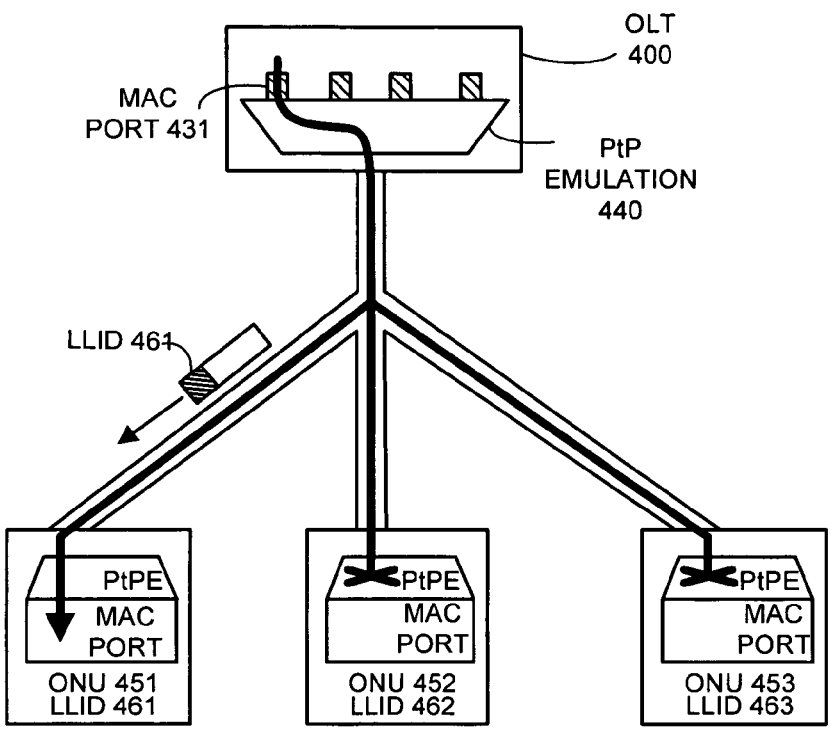
FIG. 4A illustrates transmission of downstream traffic with point-to-pint emulation in an EPON (prior art).

FIG. 4A illustrates transmission of downstream traffic with point-to-point emulation in an EPON (prior art). In PtPE mode, OLT 400 has multiple MAC ports (interfaces), each of which corresponds to an ONU. When sending an Ethernet frame downstream from MAC port 431, PtPE sub-layer 440 in OLT 400 inserts LLID 461 which is associated with MAC port 431. Although the frame is broadcast through the passive optical coupler to every ONU, only the PtPE sub-layer module located within an ONU with a matching LLID (ONU 451 with LLID 461 in this example) will accept the frame and pass it to its MAC layer for further verification. MAC layers in other ONUs (ONU 452 with LLID 462, and ONU 453 with LLID 463) will never receive that frame. Accordingly, it appears as if the frame was sent on a point-to-point link to only the destination ONU.

Figure 4B:
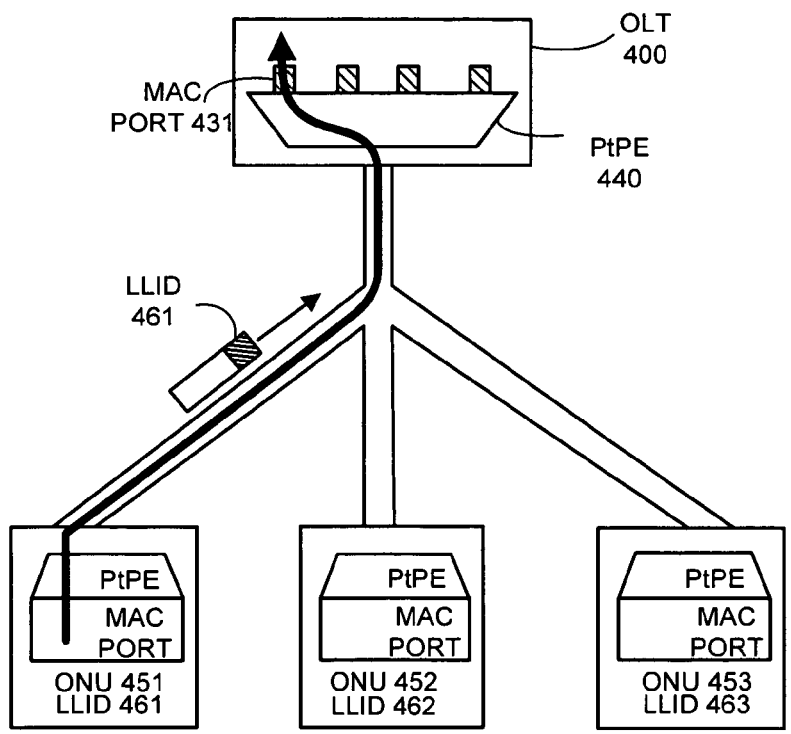
FIG. 4B illustrates transmission of upstream traffic with point-to-pint emulation in an EPON (prior art).

FIG. 4B illustrates transmission of upstream traffic with point-to-pint emulation in an EPON (prior art). In the upstream direction, ONU 451 inserts its assigned LLID 461 in the preamble of each transmitted frame. Accordingly, PtPE sub-layer 440 of OLT 400 disseminates the frame to MAC port 431.

Bridging in EPON

Figure 5:
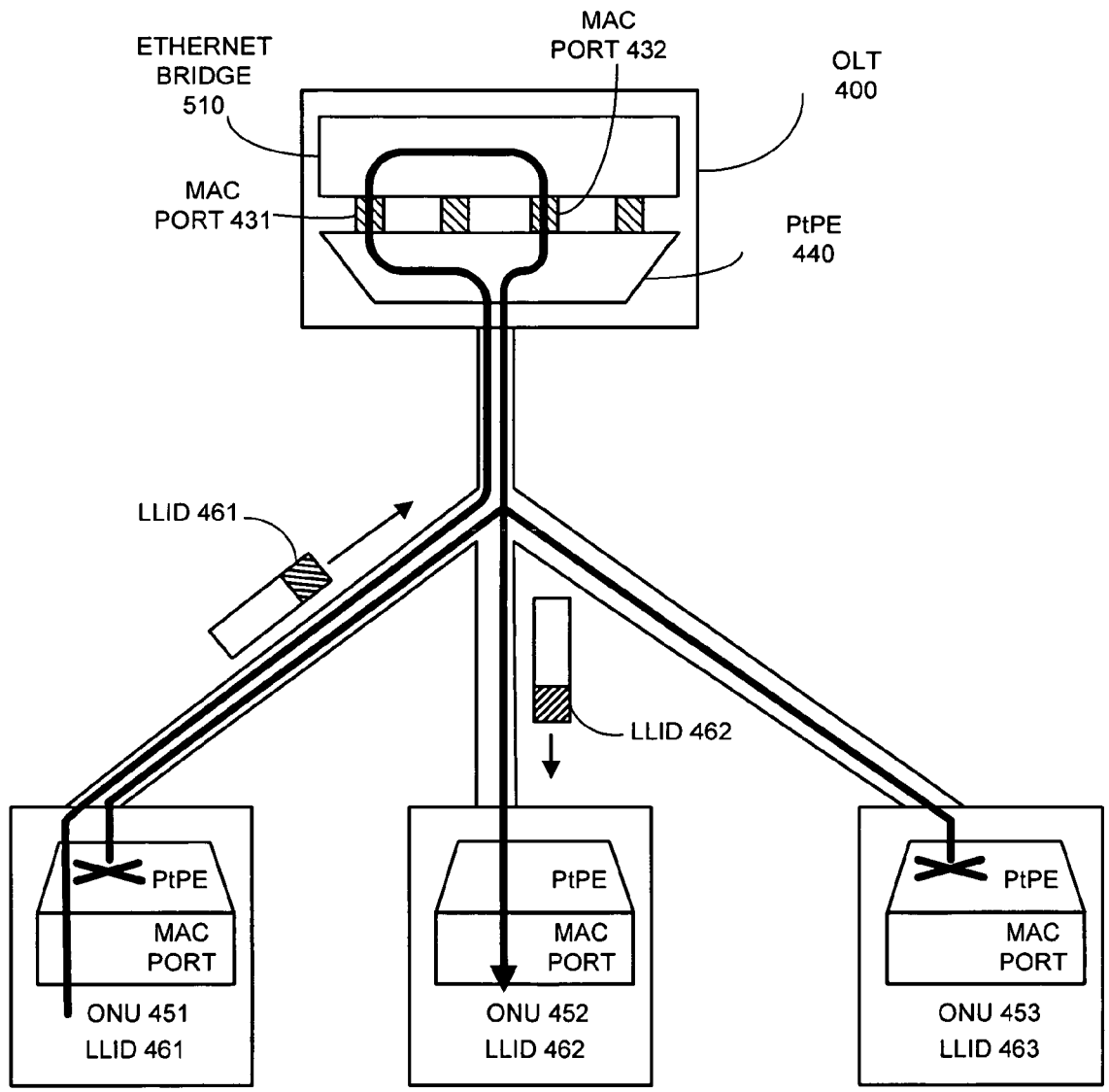
FIG. 5 illustrates bridging between ONUs with point-to-point emulation in an EPON (prior art).

FIG. 5 illustrates bridging between ONUs with point-to-point emulation in an EPON (prior art). In general, all frames transmitted (upstream and downstream) between OLT 400 and a given ONU always have the LLID assigned to the given ONU. Note that an LLID is only used to emulate a point-to-point link, not for switching or relaying frames. In this example, ONU 451 intends to send a frame to ONU 452. When the PtPE sub-layer 400 in OLT 400 receives this frame, it determines to which Ethernet-bridge port this frame should go, which in this example is MAC port 431 and which is associated with LLID 461. PtPE sub-layer 400 also removes the frame's LLID 461. Subsequently, Ethernet bridge 510 inspects the destination MAC address of the frame and determines to which port the frame should be switched, as regular Ethernet bridge would do. It then forwards the frame to the port associated with ONU 452. PtPE sub-layer 400 in turn attaches to the downstream frame LLID 462, which is associated with ONU 452. Based on LLID 462, PtPE sub-layer in ONU 452 accepts this frame and delivers the frame to ONU 452.

Virtual ONUs

Figure 6:
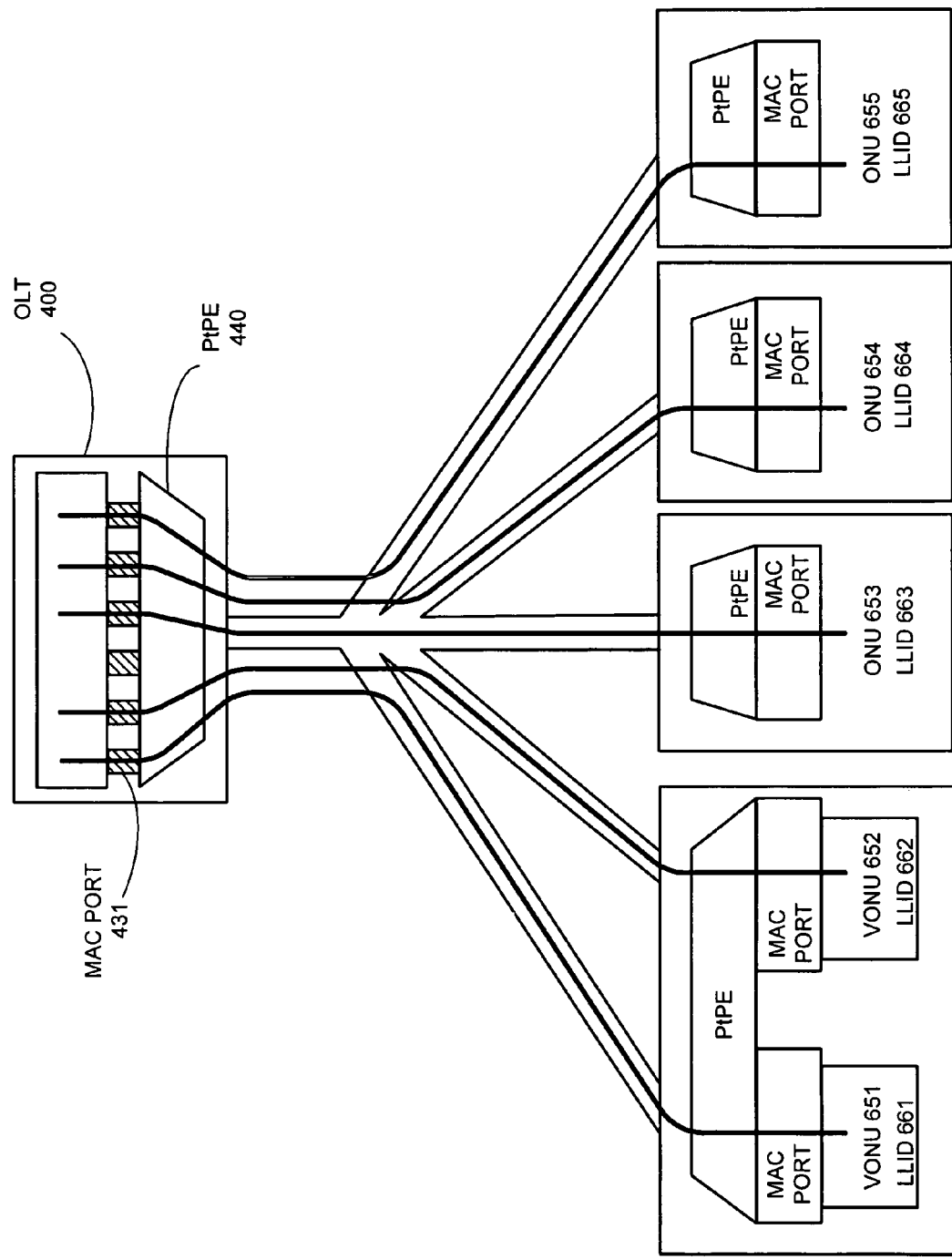
FIG. 6 illustrates virtual ONUs (VONUs) with logical links in an EPON (prior art).

FIG. 6 illustrates virtual ONUs (VONUs) with logical links in an EPON (prior art). One implementation of EPON may allow more than one LLID to be assigned to a physical ONU, wherein each LLID corresponds to an entity (e.g., a network device or an application) which needs a separate communication channel with the OLT. As shown in FIG. 6, a physical ONU 650 accommodates two virtual ONUs (VONUs) 651 and 652. VONU 651 and 652 have LLIDs 661 and 662, respectively. Correspondingly, ONU 650 has two MAC ports associated with VONU 651 and 652 respectively. In the same EPON, there may also exist separate physical ONUs, such as ONUs 653, 654, and 655 (with LLIDs 663, 664, and 665, respectively). During actual operation, OLT 400 does not distinguish VONUs from separate physical ONUs, and grants transmission slots to each VONU as if it was a separate physical ONU. For the reason stated above, the terms "VONU" and "ONU" are used interchangeably in the present invention.

Priority-VLAN Operation Mode

Figure 7:
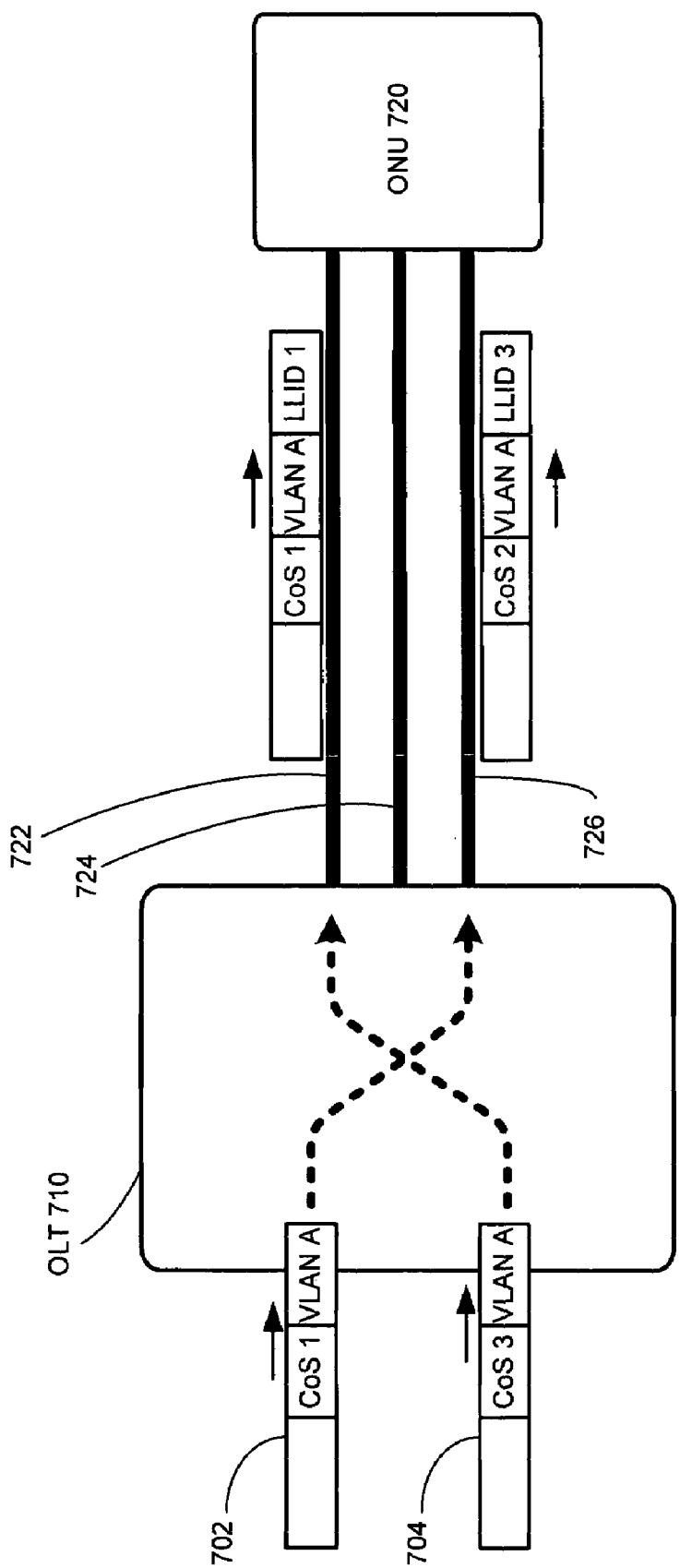
FIG. 7 illustrates an OLT operating in a priority-VLAN mode in accordance with one embodiment of the present invention.

FIG. 7 illustrates an OLT operating in a priority-VLAN mode in accordance with one embodiment of the present invention. Typically, in a VLAN-aware EPON, the OLT assigns an LLID to a downstream packet based on the packet's VLAN identifier. Although this approach allows the service provider to implement a number of VLANs in the same EPON, it does not facilitate differentiated service qualities within a VLAN. One embodiment of the present invention solves this problem by assigning different priorities to packets belonging to a single VLAN.

Because an LLID identifies a logical link between an ONU and the OLT, it is possible to establish multiple logical links on one ONU corresponding to different service qualities. In one embodiment of the present invention, the OLT reads not only the VLAN identifier but also one or more additional fields, such as the Class of Service (CoS) field in the packet's MAC header, to determine to which priority level the packet belongs. As shown in the example in FIG. 7, there are three logical links between an OLT 710 and an ONU 720, namely logical links 722, 724, and 726. Each logical link corresponds to a different priority level and is associated with a different LLID.

When a downstream packet arrives, OLT 710 reads the packet's VLAN identifier as well as the CoS field in the packet's MAC header. As shown in FIG. 7, OLT 710 receives two downstream packets 702 and 704. Both packets 702 and 704 have the same VLAN identifier ("VLAN A"). Their CoS values, however, are different. Packet 702 has a CoS value of "CoS 1," and packet 704 has a CoS value of "CoS 2." Based on the different CoS values, OLT 710 assigns LLID 1 to packet 702 and LLID 2 to packet 704, respectively. Correspondingly, packets 702 and 704 arrive at ONU 720 on logical links 726 and 722, respectively. Based on the different priority level associated with links 726 and 722, ONU 720 allocates different service qualities to packets 702 and 704.

Note that although a CoS field has only 3 bits and therefore can at most provide 8 priority levels, the system is by no means limited to using only the CoS field for priority differentiation purposes. The system can use other fields, such as the Type of Service (ToP) field in the IP header, to differentiation service qualities. In addition, the prioritized packet forwarding is not limited to the VLAN operation mode. An EPON operating in a normal mode not involving VLAN configurations can also facilitate service differentiation by using these additional fields. For example, an OLT may only use the ToS field in the IP header to facilitate prioritized forwarding of IP packets. In addition, the system may determine a packet's priority based on a given range of the value, instead of a specific value, of a packet field.

Priority-Shared-VLAN Operation Mode

In general, an EPON accommodates several VLANs so that users belonging to one VLAN will not receive traffic for other VLANs. Typically, an OLT forwards a packet destined to a VLAN by assigning to the packet a multicast LLID associated with that VLAN. For additional security, sometimes it is also desirable that a user within a VLAN does not receive traffic for other users residing in the same VLAN. A shared-VLAN operation mode can achieve such improved security.

In a shared-VLAN operation mode, the OLT learns a user's MAC address within a given VLAN by reading the source MAC address of an upstream packet transmitted by that user. When a downstream packet arrives at the OLT, the OLT reads the downstream packet's destination MAC address. If the downstream packet's destination MAC address matches one which is previously learned by the OLT, and if the downstream packet's VLAN identifier matches the VLAN identifier associated with the learned MAC address, the OLT can attach a unicast LLID to the packet. This unicast LLID allows the packet to be delivered to a specific ONU, instead of being multicast to all the ONUs within the VLAN. If a downstream packet's destination MAC address does not match any address learned by the OLT, the OLT can attach to the packet a multicast LLID which is associated with the packet's VLAN identifier. The packet is then delivered to all the ONUs within the VLAN.

Figure 8:
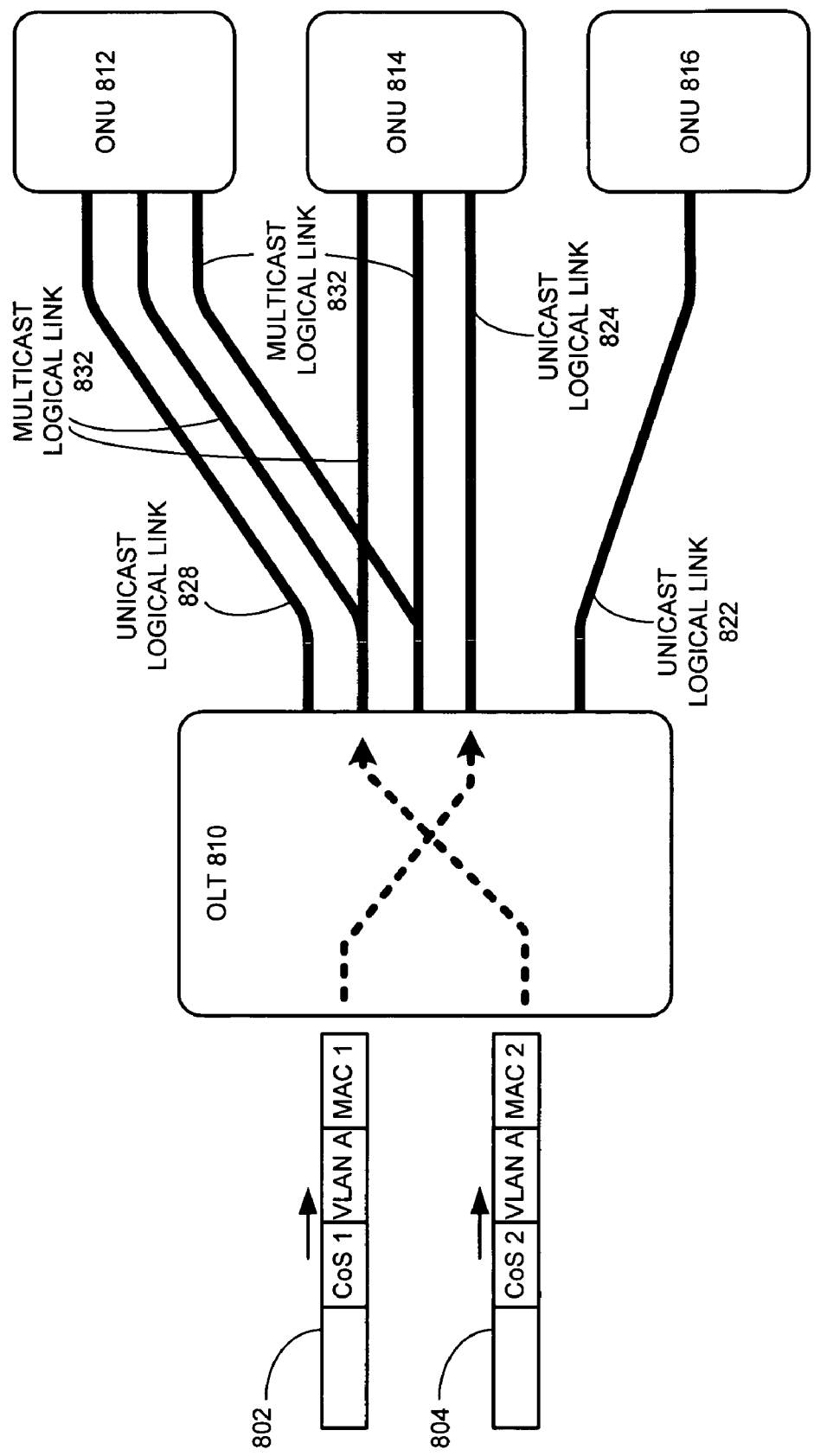
FIG. 8 illustrates an OLT operating in a priority-shared-VLAN mode in accordance with one embodiment of the present invention.

One embodiment of the present invention facilitates prioritized packet delivery in a shared-VLAN operation mode. FIG. 8 illustrates an OLT operating in a priority-shared-VLAN mode in accordance with one embodiment of the present invention. As shown in FIG. 8, ONUs 812 and 814 form a VLAN ("VLAN A"). Within this VLAN, two priority levels are provided. Accordingly, OLT 810 provides two multicast LLIDs which correspond to two multicast logical links 832 and 834. Hence, when a downstream packet destined to VLAN A arrives at OLT 810, and if OLT 810 does not recognize the downstream packet's destination MAC address, OLT 810 may attach to the packet an LLID associated with multicast link 832 or 834, according to the CoS field of the packet.

In addition to multicast links 832 and 834, OLT 810 also provides two unicast links to each of ONUs 812 and 814 (i.e., unicast links 828 and 829 for ONU 812, unicast links 814 and 825 for ONU 814). These two unicast links to each ONU allow two different priority levels for packets destined to VLAN A with a destination MAC address recognizable by OLT 810. As shown in FIG. 8, OLT 810 receives two downstream packets 802 and 804. Packet 802 has a destination MAC address "MAC 1," a VLAN identifier "VLAN A," and a CoS value "CoS 1." Similarly, packet 804 has a destination MAC address "MAC 2," a VLAN identifier "VLAN A," and a CoS value "CoS 2." Both packets 802 and 804 are destined to the same VLAN, and both of their destination MAC addresses are recognized by OLT 810. ("MAC 1" corresponds to ONU 814, and "MAC 2" corresponds to ONU 812.) However, because packets 802 and 804 have different CoS values, OLT 810 forwards packet 802 to unicast link 824 and packet 804 to unicast link 829.

If OLT 810 does not recognize the destination MAC address of packet 802, it may forward packet 802 to multicast link 832 which corresponds to the priority level associated with "CoS 1" (which is packet 802's CoS value). Similarly, if OLT 810 does not recognize the destination MAC address of packet 804, it may forward packet 804 to multicast link 834 which corresponds to the priority level associated with "CoS 2" (which is packet 804's CoS value).

Also shown in FIG. 8 is ONU 816 and a unicast logical link 822 coupled thereto. ONU 816 may belong to a separate VLAN. Note that in the example described above, OLT 810 reads a downstream packet's CoS field to determine its priority level. Nothing, however, prevents OLT 810 from reading other fields such as the ToS field for this purpose. OLT 810 may mix and match multiple fields to construct more sophisticated priority-level structures and assign LLIDs accordingly. Furthermore, the system may determine a packet's priority based on a given range of the value, instead of a specific value, of a packet field.

Priority-Bridge Operation Mode

One of the common OLT operation modes is the bridge mode. In a bridge mode, an OLT inspects the destination MAC address of every packet it receives (either downstream or upstream). If the OLT recognizes the destination MAC address, it then assigns the packet a unicast LLID associated with the corresponding ONU. (The OLT learns the MAC addresses associated with each ONU by inspecting the source MAC address of every upstream packet transmitted by the ONUs.) If the OLT does not recognize the destination MAC address, the OLT typically broadcasts the packet to multiple ONUs by attaching to the packet a broadcast LLID.

Figure 9:
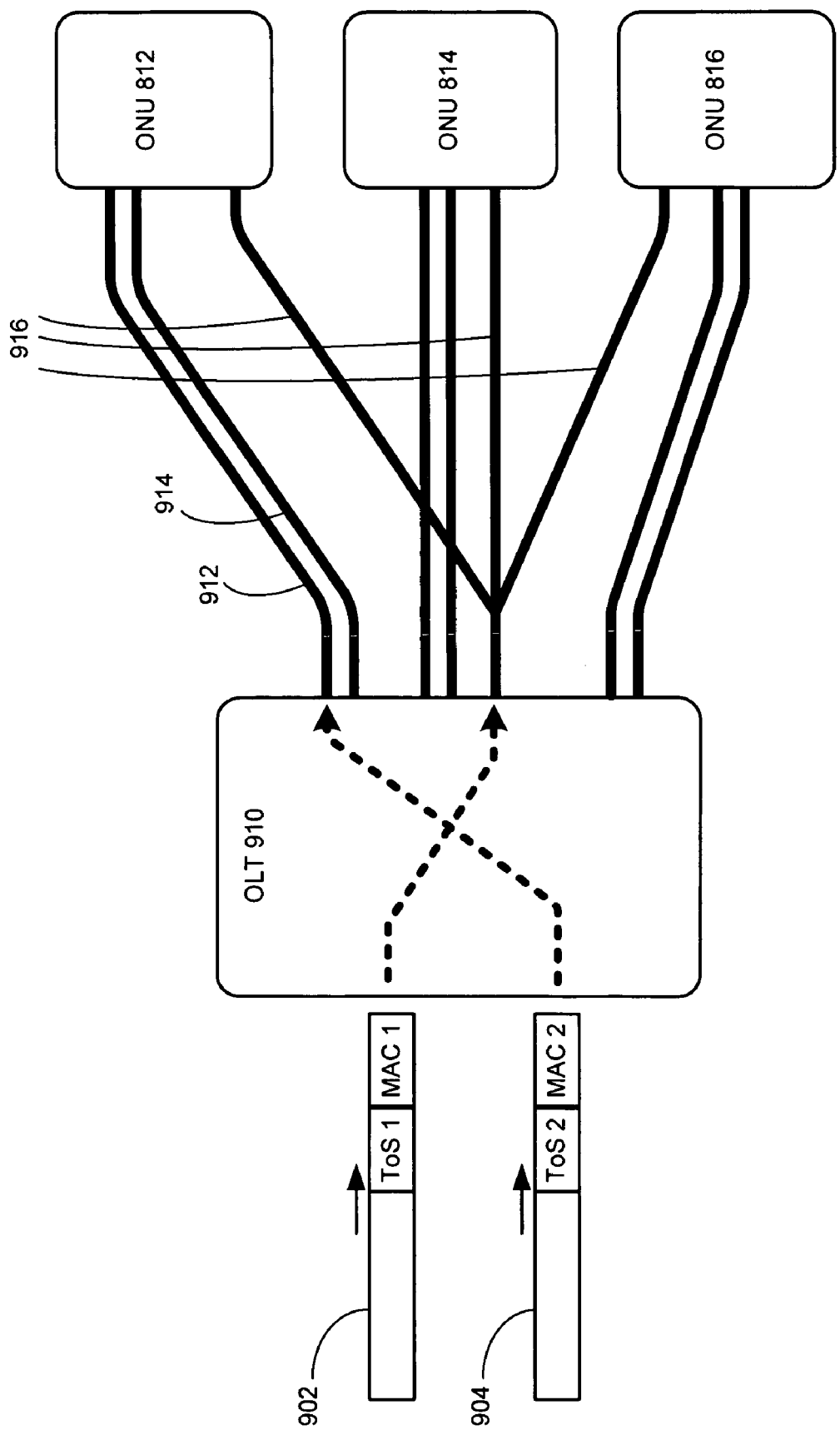
FIG. 9 illustrates an OLT operating in a priority-bridge mode in accordance with one embodiment of the present invention.

One embodiment of the present invention allows an OLT to facilitate multiple priority levels when operating in a bridge mode. FIG. 9 illustrates a priority-bridge operation mode of an OLT in accordance with one embodiment of the present invention. As shown in FIG. 9, an OLT 910 is coupled to ONUs 812, 814, and 816. There are two unicast logical links to each ONU, such as logical links 912 and 914. Each unicast link corresponds to a specific priority level. For example, logical link 912 is used to deliver packets at a priority level corresponding to a ToS value of 0-3, and logical link 914 is used to deliver packets at a priority level corresponding to a ToS value of 4-7.

In addition to the unicast links, OLT 910 also has a broadcast link 916 by which it may broadcast a downstream packet whose destination MAC address is not recognized. In the present example, OLT 910 receives two downstream packets 902 and 904. OLT 910 recognizes that the destination MAC address of packet 904 ("MAC 2") is associated with ONU 812. Hence, OLT 910 forwards packet 904 onto link 912 based on packet 904's ToS value ("ToS 2").

If OLT 910 does not recognize a downstream packet's destination MAC address, it may forward this packet onto the broadcast link. In the example shown in FIG. 9, OLT 910 does not recognize the destination MAC address of packet 902 ("MAC 1"). Therefore, OLT 910 disregards the ToS value of packet 902 and forwards packet 902 onto broadcast link 916. Consequently, packet 902 is delivered to all the ONUs. Note that in a priority-bridge operation mode, an OLT is not limited to reading only the ToS field of a packet. It may read additional fields to facilitate differentiated service qualities.

Priority-Copy Shared-VLAN Operation Mode

During the operation of an EPON, a network operator sometimes may desire to set the CoS field of an outgoing packet to facilitate additional control of service qualities in external networks (e.g., in a backbone network). One embodiment of the present invention allows an OLT to reset an outgoing upstream packet's CoS value based on its original CoS and/or ToS value. The approach disclosed herein enables a network operator to control the quality of service given to a packet beyond the scope of an EPON.

Figure 10:
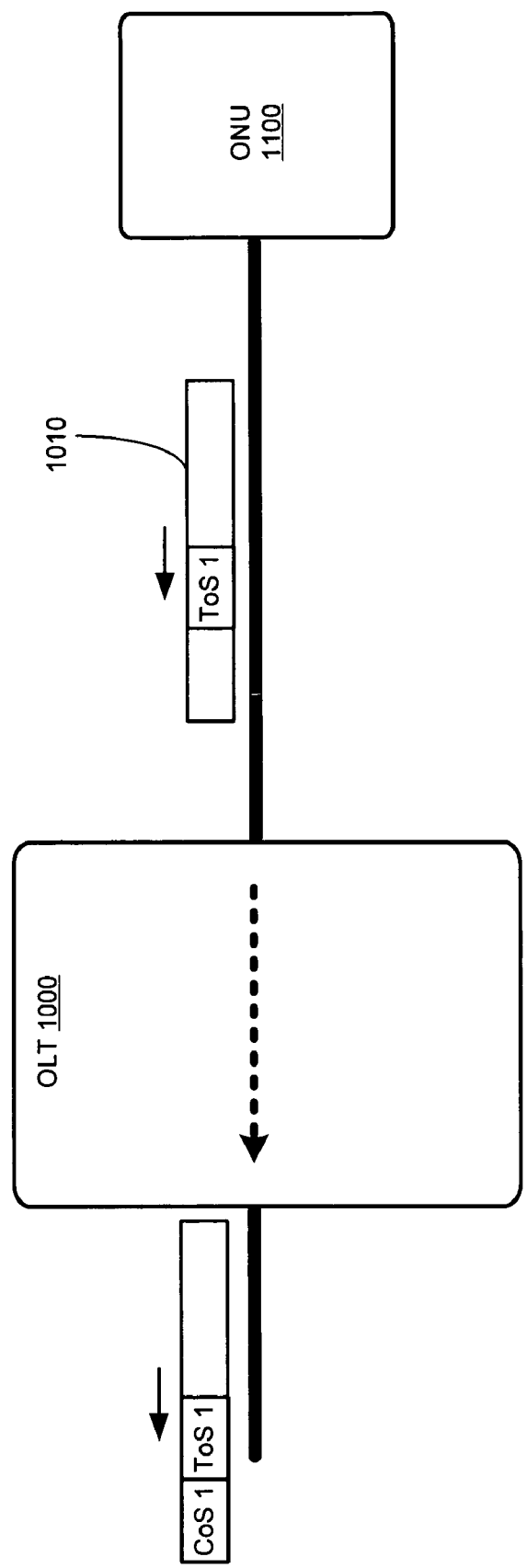
FIG. 10 illustrates an OLT operating in a priority-copy shared-VLAN mode in accordance with one embodiment of the present invention.

FIG. 10 illustrates an OLT operating in a priority-copy shared-VLAN mode in accordance with one embodiment of the present invention. As shown in FIG. 10, an OLT 1000 and an ONU 1100 are operating in a shared-VLAN mode. After ONU 1100 transmits an upstream packet 1010 to OLT 1000, OLT 1000 inspects packet 1010's ToS field. Based on the ToS value of packet 1010, OLT 1000 resets packet 1010's CoS field to a new value ("CoS 1"). Because the CoS field is a part of the layer-two (MAC layer) header, other layer-two switches outside the scope of EPON are able to allocate appropriate service quality to packet 1010 without having to read its ToS field which is within the layer-three (IP layer) header. Note that OLT 1000 is not limited to reading on the ToS field of an upstream packet. OLT 1000 can also read a number of additional fields, including a combination of ToS and CoS fields, to determine the new value of the upstream packet's CoS field.

Transparent Shared VLAN with Broadcast

In a regular shared VLAN mode, an OLT may forward a downstream packet to an ONU based on the packet's VLAN identifier by attaching to the packet a unicast LLID (where the packet is destined to a single ONU) or a multicast LLID (where the packet is destined to a group of ONUs in a multicast domain). This operation, however, requires the OLT to set up with the ONUs a number of unicast and/or multicast logical links, which are identified by the corresponding unicast and/or multicast LLIDs. One embodiment of the present invention allows the OLT to reduce the number of LLIDs used by allowing multiple VLAN identifiers to map to one multicast or broadcast LLID. In this way, multiple VLAN identifiers which in conventional shared-VLAN mode may require a number of LLIDs can now share a single LLID. Consequently, the function of selecting and forwarding downstream packets may now be performed by the ONUs.

Figure 11:
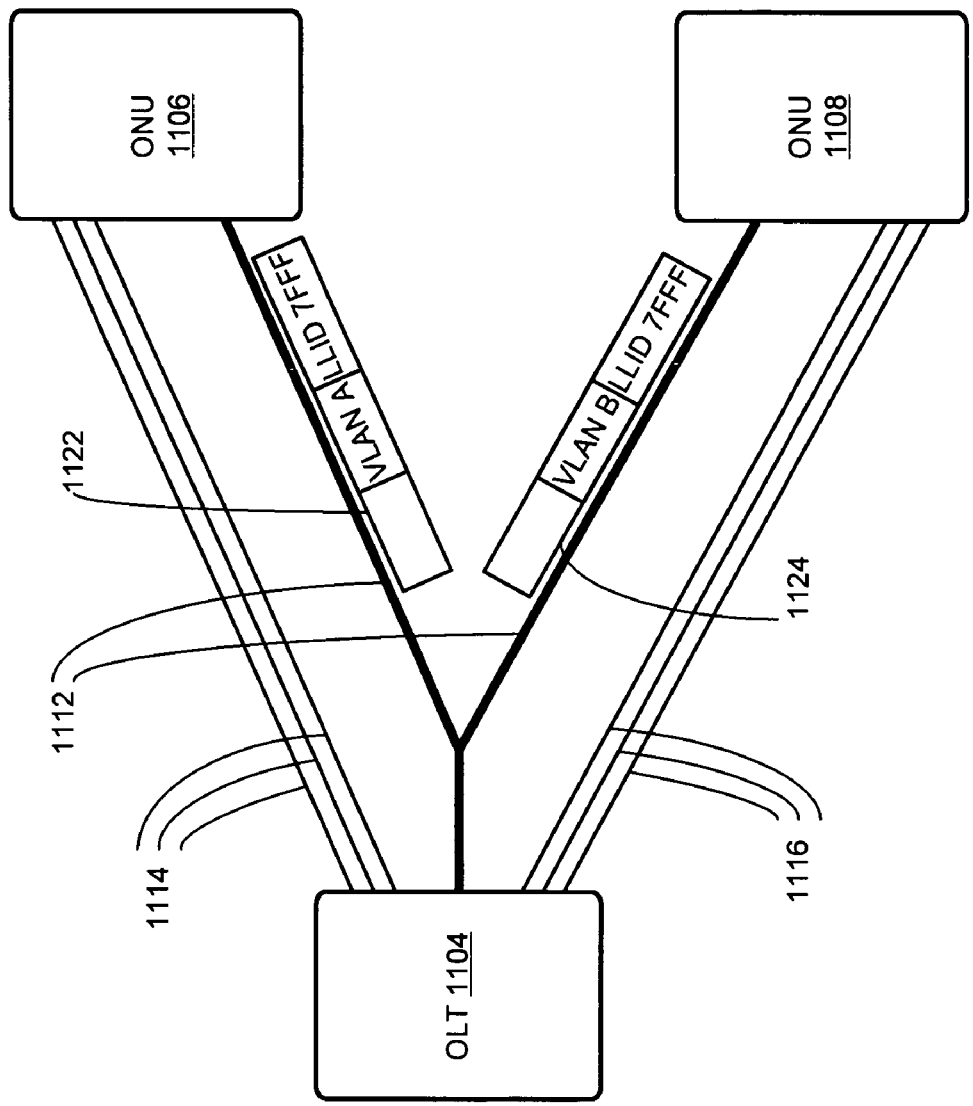
FIG. 11 illustrates an OLT operating in a transparent-shared-VLAN mode with broadcast in accordance with one embodiment of the present invention.

FIG. 11 illustrates an OLT operating in a transparent-shared-VLAN mode with broadcast in accordance with one embodiment of the present invention. As shown in this example, an OLT 1104 is in communication with ONUs 1106 and 1108. OLT 1104 sets up unicast logical links 1114 with ONU 1106, and logical links 1116 with ONU 1108. ONUs 1106 and 1108 belong to the same multicast domain. To send a multicast packet, OLT 1104 attaches to the packet a broadcast LLID (e.g., with a value of 7FFF as according to IEEE 802.3ah standard). OLT 1104 also leaves the packet's VLAN identifier intact, so that the ONUs can selectively forward the packet to its user based on the VLAN identifier. As illustrated in FIG. 11, packet 1122 has a VLAN identifier "VLAN A" and is tagged with a broadcast LLID "7FFF." Consequently, packet 1122 is transmitted to all the ONUs. However, the ONUs further filter the packets based on their VLAN identifiers. In this example, ONU 1106 receives packet 1122 based on its VLAN identifier and forwards packet 1122 to its user. Similarly, ONU 1108 receives packet 1124 based on its VLAN identifier "VLAN B" and forwards packet 1124 to its user.

The transparent-shared-VLAN mode with broadcast reduces the number of required LLIDs to be issued to the ONUs. Although the example shown in FIG. 7 illustrates the use of a universal broadcast LLID, the system may use any multicast or broadcast LLIDs. In addition, the system may establish an arbitrary mapping between a number of VLAN identifiers and a multicast/broadcast LLID. Note that the system may map a unicast packet's VLAN identifier to a multicast/broadcast LLID and let the ONUs perform the packet filtering function based on the packet's destination address. By using a multicast/broadcast LLID and by delegating partly the packet filtering function to the ONUs (since an ONU is expected to further filter a multicast/broadcast packet based on its VLAN identifier), a system can significantly reduce the need of using individual multicast LLIDs for each VLAN identifier. This also allows the system to inter-operate better with other systems.

Note that although the different operation modes described above involve mapping VLAN identifiers to LLIDs, it is possible for the system to map a packet without a VLAN identifier to an LLID. A packet without a VLAN identifier may be treated as having a null VLAN identifier. Hence, all the aforementioned modes can operate on such a packet as well.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for forwarding packets in an Ethernet passive optical network (EPON) which includes a central node and at least one remote node, the method comprising:

associating a logical link identifier (LLID) to a logical link between the central node and a remote node, wherein the logical link corresponds to a priority level based on a certain service level agreement (SLA);

receiving a packet to be forwarded to a remote node;

determining the value of fields within a medium access control (MAC) header and an Internet Protocol (IP) header of the packet which is used to indicate a priority level for the packet; and assigning an LLID to the packet based on the value of fields within the MAC header and the IP header of the packet, thereby facilitating differentiated service qualities within the EPON.

2. The method of claim 1, wherein determining the value of fields within the packet comprises determining the value of a Class of Service (CoS) field within the MAC header of the packet.

3. The method of claim 1, wherein determining the value of fields within the packet involves determining the value of a Type of Service (ToS) field within the IP header of the packet.

4. The method of claim 1, further comprising learning the source MAC addresses of upstream packets transmitted by a remote node to the central node, thereby allowing the central node to determine whether the received packet's destination MAC address matches one of the MAC addresses previously learned by the central node.

5. The method of claim 4, wherein determining value of fields within the packet comprises determining the values of the packet's:
destination MAC address,
VLAN identifier, and
at least one of CoS field and ToS field; and wherein assigning the LLID to the packet comprises
determining that the packet's destination MAC address matches a MAC address previously learned by the central node, and
assigning to the packet a unicast LLID associated with the packet's VLAN identifier, destination MAC address, and the priority level corresponding to at least one of the CoS and ToS values of the packet.

6. The method of claim 4, wherein determining value of fields within the packet comprises determining the values of the packet's:
destination MAC address,
VLAN identifier, and
at least one of CoS field and ToS field; and wherein assigning the LLID to the packet comprises
determining that the packet's destination MAC address does not match any MAC address previously learned by the central node, and
assigning to the packet a multicast LLID associated with the packet's VLAN identifier and the priority level corresponding to at least one of the CoS and ToS values of the packet.

7. The method of claim 4, wherein determining the value of fields within the packet comprises determining the values of the packet's destination MAC address and at least one of ToS and CoS fields; and wherein assigning the LLID to the packet comprises
determining that the packet's destination MAC address does not match any MAC address previously learned by the central node, and
assigning to the packet a broadcast LLID associated with the priority level corresponding to at least one of the ToS and CoS values of the packet.

8. The method of claim 4,
wherein determining the value of fields within the packet comprises determining the values of the packet's destination MAC address and at least one of ToS and CoS fields; and
wherein assigning the LLID to the packet comprises
determining that the packet's destination MAC address matches a MAC address previously learned by the central node, and
assigning to the packet a unicast LLID associated with the packet's destination MAC address and the priority level corresponding to at least one of the ToS and CoS values of the packet.

9. A method for forwarding packets in an EPON which includes a central node and at least one remote node, the method comprising:
receiving an upstream packet transmitted from a remote node;
determining the value of fields within a MAC header and an IP header of the upstream packet;
setting a value for a CoS field of the upstream packet based on the determined value of fields within the MAC header and the IP header of the upstream packet; and
forwarding the upstream packet to an external network.

10. The method of claim 9, wherein determining the value of fields of the upstream packet comprises determining the value of at least one of ToS and CoS fields of the upstream packet.

11. A method for forwarding packets in an EPON which includes a central node and at least one remote node, the method comprising:
establishing a mapping between multiple VLAN identifiers and one multicast or broadcast LLID;
receiving a downstream packet;
attaching to the packet the one multicast or broadcast LLID based on the packet's VLAN identifier or lack thereof; and
forwarding the packet to all the remote nodes, thereby allowing the remote nodes to determine whether to forward the packet to their corresponding users based on at least one of the packet's VLAN identifier and the packet's destination address.

12. An apparatus for forwarding packets in an Ethernet passive optical network (EPON) which includes a central node and at least one remote node, the apparatus comprising:
an association mechanism configured to associate an LLID to a logical link between the central node and a remote node, wherein the logical link corresponds to a priority level based on a certain SLA;
a receiving mechanism configured to receive a packet to be forwarded to a remote node;
a reading mechanism configured to determine the value of fields within a MAC header and an IP header of the packet which is used to indicate a priority level for the packet; and
an LLID assigning mechanism configured to assign an LLID to the packet based on the value of fields within the MAC header and the IP header of the packet, thereby facilitating differentiated service qualities within the EPON.

13. The apparatus of claim 12, wherein while determining the value of fields within the packet, the reading mechanism is configured to determine the value of a CoS field within the MAC header of the packet.

14. The apparatus of claim 12, wherein while determining the value of fields within the packet, the reading mechanism is configured to determine the value of a ToS field within the IP header of the packet.

15. The apparatus of claim 12, further comprising a learning mechanism configured to learn the source MAC addresses of upstream packets transmitted by a remote node to the central node, thereby allowing the central node to determine whether the received packet's destination MAC address matches one of the MAC addresses previously learned by the central node.

16. The apparatus of claim 15,
wherein while determining the value of fields within the packet, the reading mechanism is configured to determine the values of the packet's:
destination MAC address,
VLAN identifier, and
at least one of CoS and ToS fields; and
wherein while assigning the LLID to the packet, the LLID assigning mechanism is configured
to determine that the packet's destination MAC address matches a MAC address previously learned by the central node, and
to assign to the packet a unicast LLID associated with the packet's VLAN identifier, destination MAC address, and the priority level corresponding to at least one of the CoS and ToS values of the packet.

17. The apparatus of claim 15,
wherein while determining the value of fields within the packet, the reading mechanism is configured to determine the values of the packet's:
destination MAC address,
VLAN identifier, and
at least one of CoS and ToS fields; and
wherein while assigning the LLID to the packet, the LLID assigning mechanism is configured
to determine that the packet's destination MAC address does not match any MAC address previously learned by the central node, and
to assign to the packet a multicast LLID associated with the packet's VLAN identifier and the priority level corresponding to at least one of the CoS and ToS values of the packet.

18. The apparatus of claim 15,
wherein while determining the value of fields within the packet, the reading mechanism is configured to determine the values of the packet's destination MAC address and at least one of ToS and CoS fields; and
wherein while assigning the LLID to the packet, the LLID assigning mechanism is configured
to determine that the packet's destination MAC address does not match any MAC address previously learned by the central node, and
to assign to the packet a broadcast LLID associated with the priority level corresponding to at least one of the ToS and CoS values of the packet.

19. The apparatus of claim 15,
wherein while determining the value of fields within the packet, the reading mechanism is configured to determine the values of the packet's destination MAC address and at least one of ToS and CoS fields; and
wherein while assigning the LLID to the packet, the LLID assigning mechanism is configured
to determine that the packet's destination MAC address matches a MAC address previously learned by the central node, and to assign to the packet a unicast LLID associated with the packet's destination MAC address and the priority level corresponding to at least one of the ToS and CoS values of the packet.

20. An apparatus for forwarding packets in an EPON which includes a central node and at least one remote node, the apparatus comprising:
- a receiving mechanism configured to receive an upstream packet transmitted from a remote node;
- a reading mechanism configured to determine the value of fields within a MAC header and an IP header of the upstream packet;
- a value setting mechanism configured to set a value for a CoS field of the upstream packet based on the determined value of fields within the MAC header and the IP header of the upstream packet; and
- a forwarding mechanism configured to forward the upstream packet to an external network.

21. The apparatus of claim 20, wherein while determining the value of fields of the upstream packet, the reading mechanism is configured to determine the value of at least one of ToS and CoS fields of the upstream packet.

22. An apparatus for forwarding packets in an EPON which includes a central node and at least one remote node, the apparatus comprising:
- a mapping mechanism configured to establish a mapping between multiple VLAN identifiers and one multicast or broadcast LLID;
- a receiving mechanism configured to receive a downstream packet;
- an attaching mechanism configured to attach to the packet the one multicast or broadcast LLID based on the packet's VLAN identifier or lack thereof; and
- a forwarding mechanism configured to forward the packet to all the remote nodes, thereby allowing the remote nodes to determine whether to forward the packet to their corresponding users based on at least one of the packet's VLAN identifier and the packet's destination address.

* * * * *